tes Patent [19]

von Fischern

[11] 4,140,379
[45] Feb. 20, 1979

[54] ELECTRONIC EXPOSURE TIMING CIRCUIT FOR PHOTOGRAPHIC CAMERAS

[75] Inventor: Bernhard von Fischern, Ottobrunn, Fed. Rep. of Germany

[73] Assignee: Agfa-Gevaert AG, Leverkusen, Fed. Rep. of Germany

[21] Appl. No.: 783,468

[22] Filed: Mar. 31, 1977

[30] Foreign Application Priority Data

Apr. 1, 1976 [DE] Fed. Rep. of Germany ....... 2613973

[51] Int. Cl.$^2$ .......................... G03B 7/08; G03B 15/03
[52] U.S. Cl. ......................................... 354/51; 354/32; 354/149
[58] Field of Search ................... 354/23 R, 29, 30, 33, 354/36, 38, 50, 51, 60 R, 32, 34, 27, 60 F, 139, 149; 250/214 P

[56] References Cited

U.S. PATENT DOCUMENTS

| 3,245,332 | 4/1966 | Kagan | 354/51 |
| 3,500,729 | 3/1970 | Rentschler et al. | 354/51 |
| 3,687,027 | 8/1972 | Watanabe et al. | 354/50 X |
| 3,978,496 | 8/1976 | Matsumoto | 354/33 |

Primary Examiner—Richard A. Wintercorn
Assistant Examiner—William B. Perkey
Attorney, Agent, or Firm—Michael J. Striker

[57] ABSTRACT

The camera shutter is opened. An electromagnet is energized to keep the shutter open. A first timing circuit includes a photosensitive element exposed to scene light through which a timing capacitor charges. The voltage across the timing capacitor is applied to a threshold circuit which deenergizes the electromagnet when a predetermined capacitor voltage is reached. An auxiliary timing circuit includes an auxiliary capacitor which is charged independently of scene light. An auxiliary threshold circuit produces a control signal when the auxiliary capacitor voltage reaches a predetermined voltage, corresponding to a predetermined time interval. This control signal renders conductive an electronic switch connected across the photosensitive element of the first timing circuit, thereby causing the electromagnet to become deenergized. In this way, if the first timing circuit does not cause the shutter to close within the predetermined time interval, the auxiliary timing circuit does.

4 Claims, 3 Drawing Figures

ELECTRONIC EXPOSURE TIMING CIRCUIT FOR PHOTOGRAPHIC CAMERAS

BACKGROUND OF THE INVENTION

The invention relates to electronic exposure control arrangements for photographic cameras of the type including a timing circuit incorporating a photosensitve element exposed to scene light. A shutter-control magnet, for example, keeps the camera shutter open until the timing circuit determines that a predetermined total amount of light has been received by the photosensitive element, whereupon the timing circuit causes the shutter-control magnet, for example, to become deenergized, thereby closing the shutter. The type of exposure control arrangement in question additionally includes means for automatically causing the shutter to close after the elapse of a predetermined time interval, so that the shutter cannot remain open longer than the predetermined time interval.

It is already known, for example, to limit the duration of the exposure time interval during which the shutter stays open by exposing the photosensitive element of the scene-light-dependent timing circuit to light from a light source in the camera. The intensity of light from this light source is so selected that, if the actual scene light is of a predetermined low brightness level, the automatic timing circuit will cause the exposure to terminate after the elapse of an exposure time interval equal to the longest exposure time interval for which a proper exposure can be performed. This known expedient has the disadvantage that the use of the separate light source during the entire exposure operation involves a considerable additional current drain, for example upon the camera battery.

SUMMARY OF THE INVENTION

It is a general object of the invention to provide a different and novel means of limiting the duration of the scene-light-dependent exposure time interval, which furthermore involves very little additional current consumption, and is also of such a character as to lend itself to realization in integrated circuits.

According to one concept of the invention, this can be achieved by connecting across the photosensitive element of the light-dependent timing circuit an electronic switch which is non-conductive during the course of the light-dependent exposure-timing operation. The conductivity of the switch is controlled by a threshold circuit whose input receives an elapsed-time signal from an auxiliary timing circuit. After the elapse of a predetermined time interval, the elapsed-time signal reaches a value causing the threshold circuit to render the electronic switch conductive, and thereby terminate the exposure, if the scene-light-dependent timing circuit has not already done so.

In a preferred embodiment of the invention, the auxiliary timing circuit includes a timing capacitor across which an electronic start switch is connected; another electronic start switch is connected to the scene-light-dependent timing circuit. When the shutter is opened, both start switches are caused to initiate operation of their respective timing circuits; the requisite change of conductivity state of the two start switches is effected by the application of signals thereto via a common control line.

Advantageously, when the elapsed-time signal of the auxiliary timing circuit reaches the predetermined value and triggers the threshold circuit associated therewith, the latter generates a control signal which is not applied directly to the electronic switch connected across the photosensitive element of the scene-light-dependent timing circuit. Instead, this control signal is applied to an intermediate stage which responds to the control signal by generating a limited-duration control pulse which it applies to the electronic switch; the limited duration of the control pulse is selected to be sufficient to assure that the deenergization of the shutter-control electromagnet, required to effect closing of the shutter, actually occurs. This has the advantage that both the electronic start switch connected across the timing capacitor of the auxiliary timing circuit, and also the electronic switch connected across the photosensitive element, can be part of an integrated-circuit stage. Another advantage is that the electronic switch connected across the photosensitive element will be maintained conductive for only a short time period sufficient to assure that the shutter-control electromagnet becomes deenergized. The intermediate stage in question can be either a differentiator stage or a monostable multivibrator, for example.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawimng.

DESCRIPTION OF THE PREFERRED EMBODIMENTS

Figure 1:
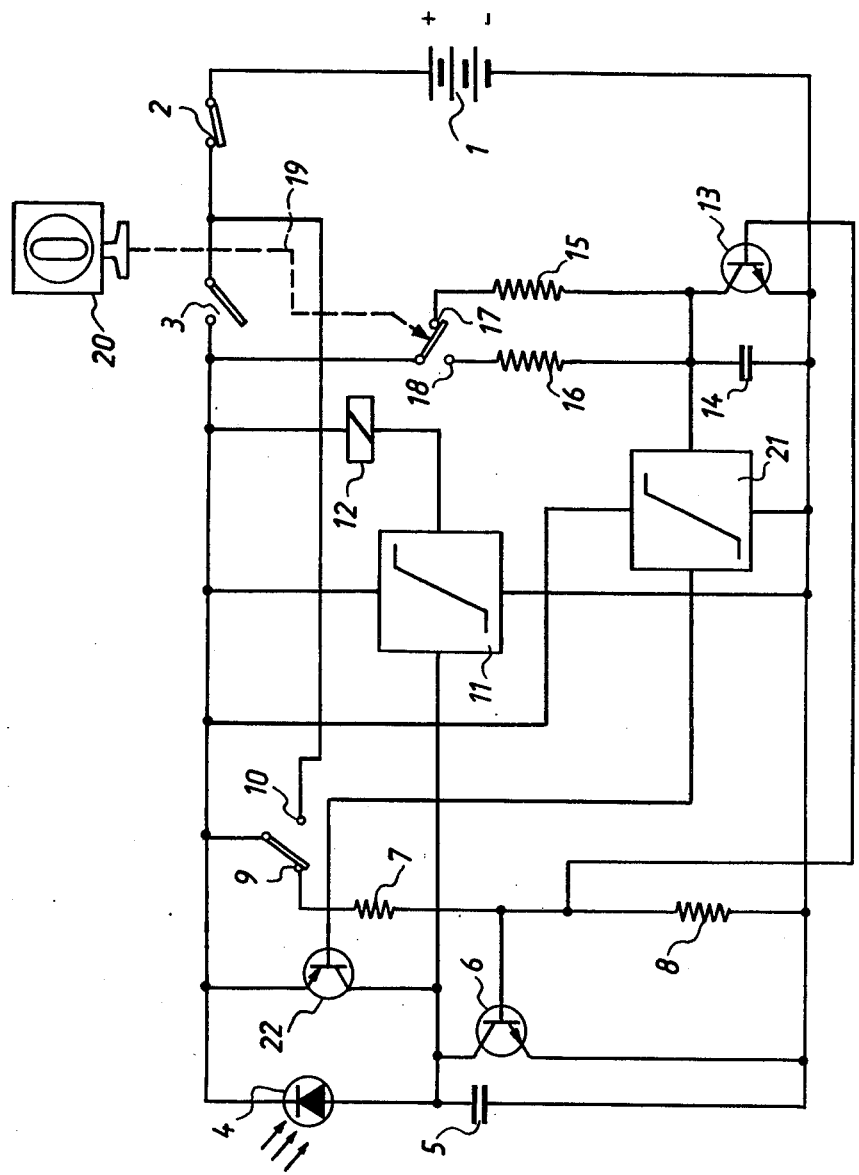
FIG. 1 depicts a first embodiment of the invention.

In FIG. 1, numeral 1 denotes a camera battery which is connectable to the illustrated circuitry by means of a first switch 2 and a second switch 3. Numeral 4 denotes a quick-responding silicon photoelement connected in series with a timing capacitor 5. Connected across the timing capacitor 5 is a transistor 6 serving as a start switch. The base of transistor 6 is connected to the tap of a voltage divider 7, 8. Voltage divider 7, 8 is connectable to the positive terminal of battery 1 via a contact 9 of a changeover switch 9, 10. The junction between the silicon photosensitive element 4 and the timing capacitor 5 is connected to the input of a threshold circuit 11 (a bistable circuit, for example a Schmitt trigger). Connected in the output current path of the threshold circuit 11 is an electromagnet 12. When energized, electromagnet 12 causes the (non-illustrated) camera shutter to be kept open. When electromagnet 12 becomes deenergized, the shutter is permitted to fall closed.

A control line leads from the tap of voltage divider 7, 8 to the base of a further transistor 13 whose collector-emitter path is connected across an auxiliary timing capacitor 14; transistor 13, likewise, serves as a start switch for the auxiliary timing circuit. The auxiliary timing circuit is comprised of the auxiliary timing capacitor 14 and one or the other of the two resistors 15 and 16. Resistors 15 and 16 are connectable to the positive terminal of battery 1 via respective ones of the contacts 17 and 18 of a changeover switch 17, 18. The moving contact arm of changeover switch 17, 18 is activatable by a flash attachment 20, through the intermediary of a mechanical linkage 19. When the flash attachment 20 is not mounted in place on the camera, contact 17 is closed; when the flash attachment 20 is mounted in place on the camera, contact 18 is closed. The junction between auxiliary timing capacitor 14 and resistors 15, 16 is connected to the input of a further threshold circuit 21 (a bistable circuit, such as a Schmitt trigger for example), the output of which is connected to the base of a switching transistor 22 whose collector-emitter path is connected across the silicon photosensitive element 4.

When the voltage applied to the input of threshold circuit 21 is less than a predetermined value, the base voltage of transistor 22 is high and accordingly transistor 22 is non-conductive. When the input voltage to threshold circuit 21 rises to above the predetermined value, the base voltage of transistor 22 is low and accordingly transistor 22 is conductive.

The resistance of resistor 15 is so selected that the time-delay interval established by auxiliary timing circuit 14, 15 is at least as long as the largest possible exposure time interval for which the automatic exposure control circuit can be relied upon to operate properly.

The resistance of resistor 16 is so selected that when the flash accessory 20 is mounted in place on the camera and activated, the auxiliary timing circuit 14, 16 establishes a time-delay interval at least equal to the duration of the longest flash that can be produced, to assure termination of the exposure upon elapse of that time-delay interval in the event that the intensity of reflected light incident upon photosensitive element 4 was not sufficient to cause the light-dependent timing circuit to have already effected shutter closing within that time-delay interval.

If the flash attachment 20 is not utilized, and if the scene light level is very low, the charging voltage of timing capacitor 5 will not reach the threshold voltage of threshold stage 11. After elapse of the preselected time interval established by auxiliary timing circuit 14, 15, the base voltage of switching transistor 22 becomes low, and accordingly transistor 22 becomes conductive. As a result, the threshold voltage of threshold circuit 11 is quickly exceeded, and as a consequence the electromagnet 12 becomes deenergized, whereupon the shutter of the camera closes.

Switch 2 can for example be the main switch which the user of the camera closes separately in advance of taking an exposure. Switch 3 can be a switch which is closed in response to the initial portion of the depression of the shutter-release button of the camera. Changeover switch 9, 10 is normally in the illustrated setting thereof, in which contact 9 is closed. Accordingly, when the user begins to depress the shutter-release button and thereby closes switch 3, control voltage will be applied to the bases of start transistors 6 and 13, rendering these transistors conductive, and thereby preventing operation of the main (light-dependent) timing circuit 4, 5 and of the auxiliary timing circuit 14, 15 (or 14, 16). As soon as the shutter actually opens, changeover switch 9, 10 assumes the non-illustrated setting thereof, wherein contact 9 is open and contact 10 is closed. As a result, start switch transistors 6, 13 become non-conductive, thereby permitting main timing circuit 4, 5 and auxiliary timing circuit 14, 15 (or 14, 16) to commence operation.

When the flash attachment 20 is mounted in place on the camera, this causes changeover switch 17, 18 to assume the non-illustrated setting thereof, wherein contact 18 is closed, so that instead of resistor 15 resistor 16 will be connected in circuit with auxiliary timing capacitor 14. If the subject to be photographed is located so far from the camera that the light emitted from flash attachment 20 and reflected back from the subject to the camera is not of great enough intensity to trigger the threshold circuit 11, then the auxiliary timing circuit 14, 16 assures that after elapse of the predetermined time interval (e.g., 1/30 of a second), the switching transistor 22 becomes conductive, and accordingly causes the electromagnet 12 to become deenergized and the shutter to close.

Figure 2:
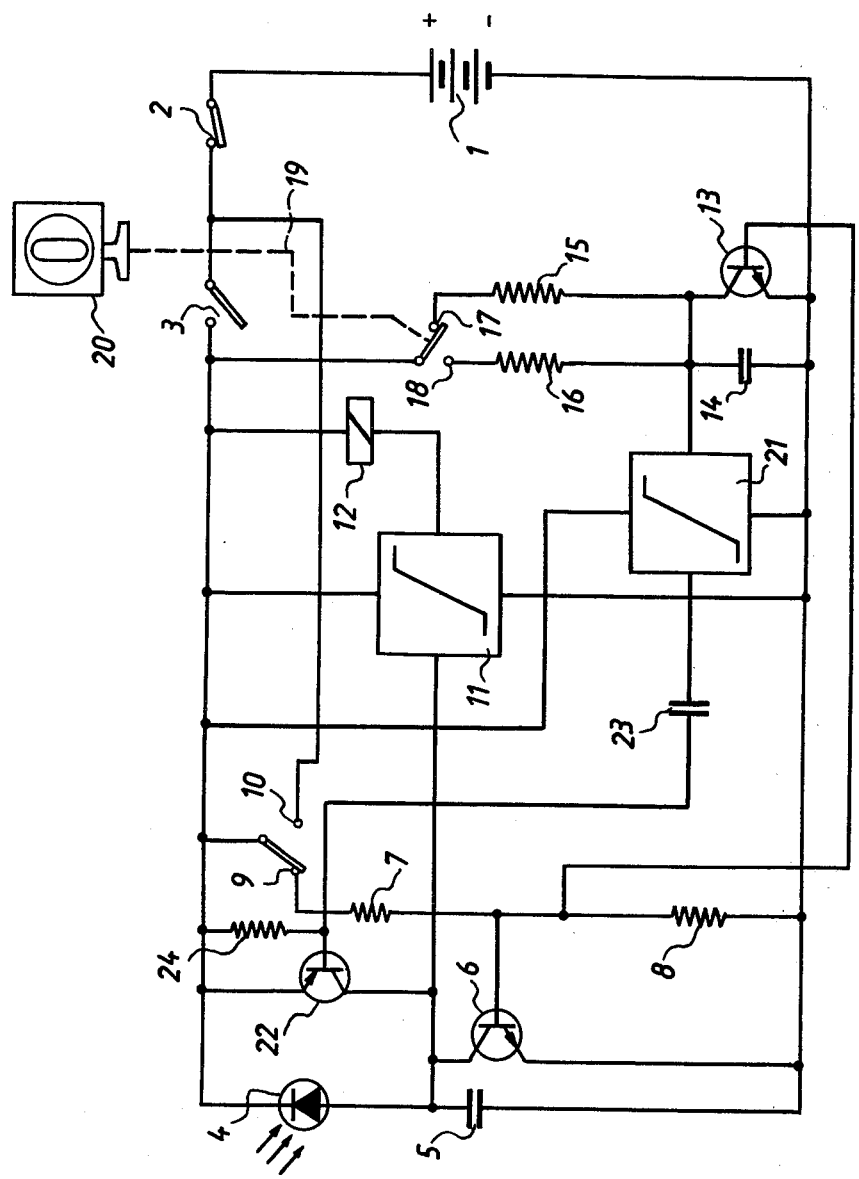
FIG. 2 depicts a second embodiment of the invention.
Figure 3:
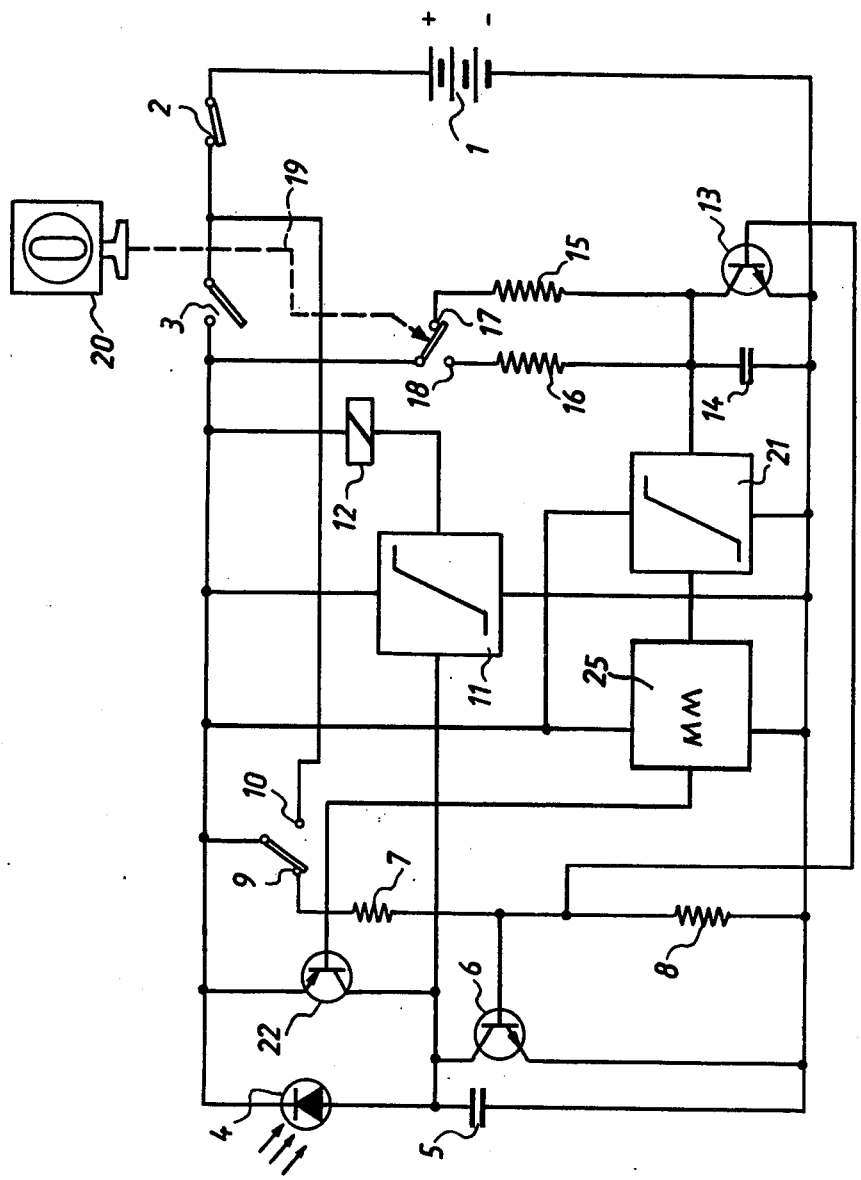
FIG. 3 depicts a third embodiment of the invention.

The embodiment of FIG. 2 is similar to that of FIG. 1, with corresponding elements being denoted by corresponding reference numerals. However, in FIG. 2, the output of threshold circuit 21 is not directly connected to the base of transistor 22, but instead is indirectly connected thereto via an intermediate stage. Here, the intermediate stage is a simple differentiator consisting of a capacitor 23 and a resistor 24. The resistance and capacitance values of elements 23, 24 are so chosen that, upon the elapse of the predetermined time interval established by auxiliary timing circuit 14, 15 (or 14, 16), the control signal appearing at the output of threshold circuit 21 as the latter is triggered is transmitted to the base of transistor 22 in the form of a brief pulse. The pulse is of such a duration as to maintain transistor 22 conductive for only a limited time interval, long enough to assure that deenergization of electromagnet 12 actually occurs. Instead of a differentiator stage 23, 24, the embodiment depicted in FIG. 3 uses for the same purpose a monostable multivibrator 25.

It will be understood that each of the elements described above, or two or more together, may also find a useful application in other types of circuits and constructions differing from the types described above.

While the invention has been illustrated and described as embodied in a particular type of scene-light-dependent automatic exposure control arrangement, it is not intended to be limited to the details show, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An exposure-timing arrangement for photographic cameras having a shutter, comprising, in combination,
   shutter-closing means operative when activated for closing the shutter of a photographic camera;
   light-dependent timing circuit means, including
   a photosensitive element receiving scene light during an exposure,
   an integrating capacitor connected in circuit with the photosensitive element to be charged by light-dependent current flowing through the photosensitive element, whereby to generate an integrated-light signal,
   a bistable threshold circuit having an input connected to the integrating capacitor for receipt of the integrated-light signal, furthermore having an output connected to the shutter-closing means, and operative for activating the shutter-closing means when the integrated-light signal reaches a predetermined value;

a semiconductor short-circuiting switch having two main electrodes defining a switching-current path and having a control electrode, the switching current path of the semiconductor short-circuiting switch being connected in parallel to the photosensitive element, the switching current path of the semiconductor short-circuiting switch when rendered conductive by a signal received at said control elecrode serving to short-circuit the photosensitive element;

auxiliary timing circuit means connected to the control electrode of the semiconductor short-circuiting switch, and operative during an exposure for automatically rendering the short-circuiting switch conductive in the event the integrated-light signal has not reached said predetermined value within a predetermined time interval, the auxiliary timing circuit means including an auxiliary integrating capacitor, means charging the auxiliary integrating capacitor to cause the voltage across the auxiliary integrating capacitor to constitute an elapse-time signal, a further bistable threshold circuit having an input connected to the auxiliary integrating capacitor for receipt of the elapsed-time signal, furthermore having an output, and operative for generating at its output a time-limit signal when the elapsed-time signal received at its input reaches a predetermined value, and pulse-generating means having an input connected to the output of the further bistable threshold circuit, furthermore having an output connected to the control electrode of the semiconductor short-circuiting switch, and operative upon receipt of the time-limit signal for converting the time-limit signal into a limited-duration pulse and applying such pulse to the control electrode of the short-circuiting switch to render the switching-current path of the latter conductive and thereby short-circuit the photosensitive element, the limited-duration pulse having a predetermined limited duration keeping the photosensitive element short-circuited for a time interval sufficiently long to assure that the shutter-closing means can perform a shutter-closing operation;

and startup means operative for initiating integration by both integrating capacitors, the startup means comprising a first semiconductor start switch having a switching-current path defined by two main electrodes and having a control electrode, the switching-current path being connected across the integrating capacitor of the light-dependent timing circuit means and serving when conductive to short-circuit such integrating capacitor, a second semiconductor start switch having a switching-current path defined by two main electrodes and having a control electrode, the switching-current path being conncted across the auxiliary integrating capacitor and serving when conductive to short-circuit the auxiliary integrating capacitor, and a common start-signal means, connected to the control electrodes of both semiconductor start switches, and operative at the start of an exposure for simultaneously rendering both semiconductor start switches non-conductive.

2. The arrangement defined in claim 1, the pulse-generating means being a differentiator.

3. The arrangement defined in claim 1, the pulse-generating means being a monostable multivibrator.

4. The arrangement defined in claim 1, the photosensitive element being a photodiode, the integrating capacitor of the light-dependent timing circuit means being so connected to the photodiode as to be charged by the reverse current of the latter during the course of an exposure.

* * * * *